United States Patent
Era

(10) Patent No.: US 9,421,631 B2
(45) Date of Patent: Aug. 23, 2016

(54) SQUEEZING DETECTION CONTROL METHOD FOR CONSUMABLE ELECTRODE ARC WELDING

(75) Inventor: Tetsuo Era, Osaka (JP)

(73) Assignee: DAIHEN Corporation, Osaka (JP)

( * ) Notice: Subject to any disclaimer, the term of this patent is extended or adjusted under 35 U.S.C. 154(b) by 1035 days.

(21) Appl. No.: 11/725,394

(22) Filed: Mar. 19, 2007

(65) Prior Publication Data

US 2007/0221642 A1 Sep. 27, 2007

(30) Foreign Application Priority Data

Mar. 27, 2006 (JP) .................................. 2006-84788

(51) Int. Cl.
| | |
|---|---|
| B23K 9/10 | (2006.01) |
| B23K 9/095 | (2006.01) |
| B23K 9/073 | (2006.01) |
| B23K 9/09 | (2006.01) |

(52) U.S. Cl.
CPC .............. B23K 9/0956 (2013.01); B23K 9/073 (2013.01); B23K 9/093 (2013.01); B23K 9/0953 (2013.01)

(58) Field of Classification Search
CPC ............. B23K 9/10; B23K 9/09; B23K 9/095
USPC ................................ 219/130.1, 130.21, 130.5
See application file for complete search history.

(56) References Cited

U.S. PATENT DOCUMENTS

| | | | | |
|---|---|---|---|---|
| RE33,330 E | * | 9/1990 | Ogasawara et al. ...... | 219/137 PS |
| 5,464,958 A | * | 11/1995 | Flowers et al. .......... | 219/130.51 |
| 2004/0263183 A1 | * | 12/2004 | Naidu et al. ................... | 324/536 |
| 2006/0207983 A1 | * | 9/2006 | Myers et al. ............ | 219/137 PS |

FOREIGN PATENT DOCUMENTS

JP 2006-26718 2/2006

* cited by examiner

*Primary Examiner* — Dana Ross
*Assistant Examiner* — Ayub Maye
(74) *Attorney, Agent, or Firm* — Hamre, Schumann, Mueller & Larson, P.C.

(57) ABSTRACT

A squeezing detection control method is provided for consumable electrode arc welding in which a cycle of arc generation and short-circuiting is repeated between a consumable electrode and a base metal. First, squeezed droplet is detected as a premonitory sign of arc recurrence at the end of the short-circuiting. This detection is based on a fact that a squeeze detection reference value is attained by a differential value of the voltage or resistance between the consumable electrode and the base metal. Then, a welding current supplied to a short-circuit load is rapidly decreased upon detection of the squeezed droplet. Upon recurrence of the arc, the welding current is increased. This arc recurrence is detected by a fact that the differential value attains an arc recurrence reference value which is greater than the squeeze detection reference value.

5 Claims, 8 Drawing Sheets

Prior Art

Prior Art

SQUEEZING DETECTION CONTROL METHOD FOR CONSUMABLE ELECTRODE ARC WELDING

BACKGROUND OF THE INVENTION

1. Field of the Invention

The present invention relates to a squeezing detection control method in consumable electrode arc welding for reducing spattering of molten metal by rapidly decreasing a welding current, immediately before the arc restrikes, upon detection of the squeeze of the droplet during the short circuit period.

2. Description of the Related Art

FIG. 5 shows electric-current and voltage waveforms and a droplet in consumable electrode arc welding in which the cycle of a short circuit period Ts and an arc period Ta is repeated. Specifically, Graph 5(A) shows a welding current Iw which passes through the consumable electrode (hereinafter called welding wire 1). Graph 5(B) shows a welding voltage Vw applied between a power supply chip and a base metal 2. Pictures 5(C)-5(E) show how a droplet 1a changes in shape.

During the short circuit period Ts between Time Point t1 and Time Point t3, a droplet 1a is at the tip of the welding wire 1, making a short-circuit with the base metal 2. In this period, as shown in Graph 5(A), the welding current Iw increases gradually, and as shown in Graph 5(B), the welding voltage Vw assumes a low value of a few volts due to the short-circuit situation. As shown in Picture 5(C), the droplet 1a makes contact with the base metal 2, thereby making the state of short-circuiting at. Time Point t1. Then, as shown in Picture 5(D), squeezing or constriction 1b develops in an upper portion of the droplet 1a due to an electromagnetic pinch caused by the welding current Iw passing through the droplet 1a. The squeezed droplet 1b becomes narrower rapidly, and at Time Point t3 as shown in Picture 5(E), the droplet 1a leaves the welding wire 1, into a molten pool 2a, which allows an arc 3 to restrike.

When the above squeezing phenomenon occurs, the short circuiting comes to an end within a very short period of time of a few tens through a few hundreds of microseconds (μs), whereby the arc 3 restrikes. This indicates that the squeezing phenomenon is a premonitory sign of the end of short circuiting. When the squeezed droplet 1b appears, the path for the welding current Iw becomes narrow at the squeezed portion, which increases the resistance r of the squeezed portion. The resistance r increases with the progress of the squeezing, i.e. as the squeezed portion becomes narrower. Therefore, it is possible to detect the squeezing phenomenon by detecting the change in resistance r between the welding wire 1 and the base metal 2 during the short circuit period Ts. The change in the resistance r can be calculated by its deferential value $dr/dt=d(Vw/Iw)/dt$. Since the squeeze period lasts only for a very short period, the change in the welding current Iw while the squeezing is present is very little, as seen from Graph 5(A). Therefore, the occurrence of the squeezing phenomenon can also be detected by the change in the welding voltage Vw, i.e. $dVw/dt$. In practice, the differential value of the resistance r or the welding voltage Vw is calculated in the short circuit period Ts, and it is checked if the differential value has reached a predetermined squeeze detection reference value Vtn. Although the following description assumes that the detection of the squeezed droplet is conducted on the basis of the differential value $dVw/dt$ of the welding voltage, the detection may also be possible on the basis of the differential value $dr/dt$ of the resistance, or other conventional methods.

Detection of arc recurrence (or arc restriking) at Time Point t3 is made by checking if the welding voltage Vw is no longer lower than a short-circuit determination value Vts. As readily seen, the period in which Vw<Vts is the short circuit period Ts, and the period in which Vw≥Vts is the arc period Ta. Before used for the short/arc detection, the welding voltage Vw is subjected to low-pass filtering to remove high frequency noises. Otherwise, erroneous detection may result due to the fact that the welding voltage Vw and the welding current Iw tend to greatly vary along with the change of the arc length which is caused by the change of the arc load during the arc period Ta. Such filtering may cause a delay of a few tens of microseconds in the short/arc detection. This delay does not give rise to any serious problems for typical consumable electrode arc welding, where the welding current Iw and the welding voltage Vw are controlled for both the short circuit period and arc period.

When the arc restrikes at Time Point t3, the welding current Iw decreases gradually as shown in Graph 5(A) whereas the welding voltage Vw assumes an arc voltage which is a few tens of volts as shown in Graph 5(B). During the arc period Ta, the tip of the welding wire 1 is melted to form a droplet 1a, and the base metal 2 is also melted. Generally in consumable electrode arc welding, a constant-voltage power source is used for realizing the optimum arc length. By consumable electrode arc welding accompanied with short circuiting, a low welding current average (hence a low wire feeding speed) leads to short-circuiting transfer welding, whereas a high welding current average leads to globular transfer welding.

If the current Ia is large at Time Point t3 when the arc restrikes in the welding, the pressure (arc force) from the arc 3 to the molten pool 2a becomes very large, and this produces a large amount of spatter. The amount of spatter increases essentially in proportion to the welding current Ia at the time of arc recurrence. If the spattering is to be reduced, it is necessary to decrease the welding current Ia at the time of arc recurrence. To achieve this, a number of proposals have been made for a squeezing detection control method of detecting the squeezing phenomenon and rapidly decreasing the welding current Iw thereby decreasing the welding current Ia at the time of arc recurrence. Hereinafter, these conventional techniques will be described.

FIG. 6 is a block diagram of a welding power source which operates on a conventional squeezing detection control method of the squeezed droplet. Note that FIG. 6 does not show blocks related to wire feeding.

A power source main circuit PM receives commercially available power (such as 200 V three-phase power) as an input, provides output controls (such as inverter control, thyristor phase control and so on) in accordance with error amplification signals Ea to be described later, and outputs output voltage Eo and welding current Iw. A parallel circuit consisting of a transistor TR and a resistor R is inserted in the power path. As described below, the transistor TR is turned off when a squeezed droplet is detected, which causes a rapid decrease in the welding current Iw passing through the parallel circuit. When a squeezed droplet is detected in a short-circuit state, the output from the power source main circuit PM is stopped, while the energy stored in a reactor in the power source main circuit PM is discharged. This decreases the welding current Iw. The speed of this decrease depends on the resistance of the short-circuit load and the inductance of the reactor. The resistor R is put at the illustrated position to increase the fall speed of the welding current when a squeezed droplet is detected. The resistance of the resistor R is a few tens of times the short-circuit load (which is about 0.01Ω). With this arrangement, the welding current Iw falls rapidly within about 100 μs when a squeezed droplet is detected. The welding wire 1 is supplied at a constant speed to generate an arc 3 between itself and the base metal 2.

The voltage detection circuit VD detects a welding voltage Vw and outputs a voltage detection signal Vd. A voltage differentiation circuit DV differentiates the voltage detection signal Vd and outputs a voltage differentiation signal Dv=dVw/dt. A voltage filter circuit VF filters the voltage detection signal Vd with a low-pass filter, thereby removing high frequency noise, and outputs a voltage filter signal Vf. A short circuit determination circuit SD compares the voltage filter signal Vf with a predetermined short-circuit determination value Vts and outputs a short circuit determination signal Sd which assumes High level during the short circuit period. A detection circuit of squeezed droplet ND outputs a squeeze detection signal Nd which assumes High level for a short period of time, at a time when the voltage differentiation signal Dv has reached a predetermined squeeze detection reference value Vtn (upon detection of a squeezed droplet) A flip-flop circuit FF outputs a squeeze detection period signal Tn which is set to Low level by the squeeze detection signal Nd and is reset to High level by a fall of the short circuit determination signal Sd (upon recurrence of the arc).

A drive circuit DR outputs a drive signal Dr which turns on the transistor TR when the squeeze detection period signal Tn is at High level. The squeeze detection period signal Tn assumes Low level during the squeeze period, upon detection of the squeezed droplet until the arc restrikes, during which the transistor TR is turned off, and the welding current Iw passes through the resistor R, thereby decreasing rapidly.

A rise period setting circuit TUR outputs a predetermined rise period setting signal Tur. A low squeeze current setting circuit IMR outputs a predetermined low squeeze current setting signal Imr. A high arc-current setting circuit IHR outputs a predetermined high arc-current setting signal Ihr. A detection current control circuit NIC receives the above-mentioned setting signals Tur, Imr, Ihr and the squeeze detection period signal Tn as inputs, and outputs a power source characteristic switching signal Sw and an electric-current setting signal Ir to be described later with reference to FIG. 7.

An output voltage setting circuit ER outputs a predetermined output voltage setting signal Er. An electric-current detection circuit ID detects the welding current Iw and outputs an electric-current detection signal Id. An output voltage detection circuit ED detects the output voltage Eo and outputs an output voltage detection signal Ed. A voltage error amplification circuit EV amplifies an error between the output voltage setting signal Er and the output voltage detection signal Ed, and outputs a voltage error amplification signal Ev. An electric-current error amplification circuit EI amplifies an error between the electric-current setting signal Ir and the electric-current detection signal Id, and output an electric-current error amplification signal Ei. A power characteristic switching circuit SW receives the power source characteristic switching signal Sw as an input, assumes Position "b" during the squeeze period and the rise period Tu to be described later with reference to FIG. 7, and outputs the electric-current error amplification signal Ei as an error amplification signal Ea, whereas during the other periods, it assumes Position "a" and outputs the voltage error amplification signal Ev as an error amplification signal Ea. Therefore, the period in which it assumes Position "a" is a constant-current characteristic period whereas the period in which it assumes Position "b" is a constant-voltage characteristic period.

FIG. 7 shows a timing chart of each signal in the welding power source described above with reference to FIG. 6. Graph 7(A) shows the welding current Iw, Graph 7(B) shows the welding voltage Vw, Graph 7(C) shows the short circuit determination signal Sd, Graph 7(D) shows the squeeze detection signal Nd, Graph 7(E) shows the voltage differentiation signal Dv, Graph 7(F) shows the squeeze detection period signal Tn, and Graph 7(G) shows the electric-current setting signal Ir.

During the short circuit period Ts from Time Point t1 to Time point t3, as shown in Graph 7(C), the short circuit determination signal Sd assumes High level but its rise and fall timings are delayed by Td because of the low-pass filtering operation described earlier. Therefore, the short circuit determination signal Sd assumes Low level at Time Point t4 which is a time point delayed from the arc recurrence Time Point t3 by the delay time Td. The length of the delay time Td is a few hundreds of microseconds as described above.

At Time Point t2, when squeezing appears at the droplet and the welding voltage Vw increases as shown in Graph 7(B), the voltage differentiation signal Dv=dVw/dt increases rapidly as shown in Graph 7(D) and reaches a predetermined squeeze detection reference value Vtn. As a result, the squeeze detection period signal Tn changes to assume Low level as shown in Graph 7(E). The squeeze detection period signal Tn continues to be at Low level until Time Point t4 when the short circuit determination signal Sd in Graph 7(C) assumes Low level. As shown in Graph 7(G), the electric-current setting signal Ir assumes the value of the high arc-current setting signal Ihr in FIG. 6 at Time Point t4 when the short circuit determination signal Sd in Graph 7(C) changes to Low level and during the rise period Tu which is determined by the rise period setting signal Tur in FIG. 6, whereas during the other period, it assumes the value of the low squeeze-current setting signal Imr. Simultaneously, though not illustrated in the chart, the power source characteristic switching signal Sw in FIG. 6 assumes High level to provide the constant-current characteristic during the period from Time Point t2 through Time Point t5 whereas it assumes Low level to provide the constant-voltage characteristic in the other periods.

During the period from Time Point t2 through Time Point t4 when the squeeze detection period signal Tn in Graph 7(E) assumes Low level, the transistor TR in FIG. 6 is turned off and as shown in Graph 7(A), the welding current Iw which falls rapidly from Time Point t2 is maintained at the low squeeze current Im which is the level set by the low squeeze-current setting signal Imr in Graph 7(G). At Time Point t3, the arc restrikes as shown in Graph 7(B), and the welding voltage Vw rises rapidly at Time Point t3. At this point of arc recurrence, as shown in Graph 7(A) the welding current Iw assumes the low squeeze current Im which is a few tens of amperes, whereby spattering is reduced. At Time Point t4, the electric-current setting signal Ir changes to the high arc-current setting signal Ihr as shown in Graph 7(G), and therefore, the welding current Iw increases as shown in Graph 7(A), to a high arc current Ih which is a value set by the high arc-current setting signal Ihr, and at Time Point t5 shifts to an arc current which is determined by the constant-voltage characteristic. With the above, as shown in Graph 7(D), the voltage differentiation signal Dv makes a rapid increase until Time Point t2, and then makes a rapid decrease from Time Point t2 as the welding current Iw decreases rapidly. Then, when the arc restrikes, the signal makes a rapid increase again, following the rapid rise of the welding voltage Vw. After Time Point t3, the signal assumes the value zero essentially, since the welding voltage Vw does not change very much.

According to the conventional art, as explained above, spattering can be decreased by controlling the welding current to the low squeeze current Im when the arc restrikes (See JP-A-2006-26718).

In the conventional art, however, the fall of the short circuit determination signal Sd (Time Point t4) is delayed by the time Td as shown in Graph 7(C) from the recurrence of the arc (Time Point t3). This is because, as already described, the welding voltage Vw is passed through a low-pass filter in order to eliminate misdetection of a short circuit. Because of this delay time Td, as shown in Graph 7(A), the welding current Iw does not increase but stays at a low value when the arc restrikes at Time Point t3. Further, the delay time Td is a fixed length of period determined by the low-pass filter setting, and the value, which is a few tens of microseconds, is not a negligible length.

In short-circuit transfer welding, which uses a relatively low current range, the delay time Td does not pose a major problem in welding stability. However, in middle-current through large-current operation such as welding in which short-circuit transfer welding and globular transfer welding are both present, or in globular transfer welding, or in spray transfer welding, the delay time Td often affects the welding stability since short-circuiting often occurs irregularly and therefore there is a wide range of variation in the droplet size when the short circuit occurs. The delay time also causes a wide range of differences in the time course of the squeezed phenomenon and in squeeze detection accuracy. As a result, a squeezed droplet is not detected sometimes until toward the end of the squeezed phenomenon, and in such a case, the arc restrikes in an extremely short time (less than a few tens of microseconds) after the squeezed droplet is detected.

FIG. 8 shows a timing chart, corresponding to those in FIG. 7, which depict a case where the arc restrikes immediately after a squeezed droplet is detected. Graph 8(A) through Graph 8(G) show different patterns of the same signals as shown in FIG. 7.

As a squeezed portion grows narrower at Time Point t2, the welding voltage Vw increases as shown in Graph 8(B). At the same time, the voltage differentiation signal Dv increases rapidly as shown in Graph 8(D) to reach the squeeze detection reference value Vtn, while as shown in Graph 8(E), the squeeze detection signal Nd assumes High level for a short period of time. In response to this, as shown in Graph 8(F), the squeeze detection period signal Tn changes to assume Low level, switching off the transistor TR. Thus, the welding current Iw falls rapidly as shown in Graph 8(A).

When the arc restrikes at Time Point t3, immediately after Time Point t2, the welding voltage Vw rises rapidly as shown in Graph 8(B). However, as shown in Graph 8(C), the short circuit determination signal Sd falls with a delay by Td due to the low-pass filter, and the signal continues to be at High level until Time Point t4. During this period, the squeeze detection period signal Tn in Graph 8(F) continues to be at Low level, and therefore the transistor TR continues to be in the OFF state, and as shown in Graph 8(A), the welding current Iw assumes the low squeeze current Im. At Time Point t4 when the delay time Td has lapsed as shown in Graph 8(C), the short circuit determination signal Sd changes to Low level (arc state). In response to this, as shown in Graph 8(E), the squeeze detection period signal Tn assumes High level to turn on the transistor TR. Simultaneously, as shown in Graph 8(F), the electric-current setting signal Ir assumes the high arc-current setting value Ihr, and thus the welding current Iw begins to increase as shown in Graph 8(A).

In middle-to-high current range welding, wire feeding speed is greater than in low current range welding, and vibration of the molten pool is also greater. If the welding current Iw is low during the period from Time Point t3 (when the arc restrikes) to Time Point t5, the melting speed of the wire becomes slower than the feeding speed, and the arc length becomes shorter. In this state, when the molten pool vibrates, short circuiting occurs at Time Point t5. This short circuiting takes place in a state where the wire tip is not melted (without a droplet).

When the short circuiting occurs at Time Point t5, the welding voltage Vw drops to a low value, as shown in Graph 8(B), and the welding current Iw, as shown in Graph 8(A), increases with the short-circuit load, while the short circuit determination signal Sd assumes High level with a slight delay, as shown in Graph 8(C). Since the wire tip is not melted in this short circuiting, the short circuiting does not come to an end even at Time Point t6. Thus, in order to forcefully terminate the short-circuit, the welding current Iw is increased as shown in Graph 8(A), to an extraordinary great value ("short-circuit termination value"). As a result, the wire melts at Time Point t7 and the arc restrikes. In this process, no squeezed droplet is formed since it is the solid wire that is broken. After Time Point t6, the system is in a short-circuit termination process, and in this process, the squeeze detection signal Nd shown in Graph 8(E) is not produced even when the voltage differentiation signal Dv has reached the squeeze detection reference value Vtn as shown in Graph 8(D).

In conducting the above-described short-circuit termination, it has been found that the large amount of current passing through the wire causes excessive spattering, and leads to unstable welding condition. Such an appropriate welding condition incurs irregular occurrence of short-circuiting and significantly degrades the quality of welding.

SUMMARY OF THE INVENTION

It is therefore an object of the present invention to provide a squeezing detection control method in consumable electrode arc welding which is capable of solving the above-described problems.

In order to solve the above-described problems, a first invention provides a squeezing detection control method in consumable electrode arc welding in which a cycle of arc generation and short-circuiting is repeated between a consumable electrode and a base metal. The method includes steps of: detecting squeezed droplet as a premonitory sign of arc recurrence at an end of the short-circuiting, where the detecting is based on a fact that a predetermined squeeze detection reference value is attained by a differential value of a voltage or of a resistance between the consumable electrode and the base metal; decreasing rapidly a welding current supplied to a short-circuit load upon detection of the squeezed droplet; and increasing the welding current upon recurrence of the arc. The arc recurrence is detected by a fact that the differential value attains a predetermined arc recurrence reference value which is greater than the squeeze detection reference value.

Preferably, the rapid decreasing of the welding current may be performed only when the change rate of the differential value upon attainment of the squeeze detection reference value is smaller than a predetermined value.

According to the present invention, the arc recurrence is detected without delay through an event that the differential value of the welding voltage has reached a predetermined arc recurrence reference value. In squeezing detection control, this enables one to increase the welding current without delay from the arc recurrence. Since the welding current increases at the moment of arc recurrence even when the arc restrikes immediately after the squeezed droplet is detected, the arc length does not become short, re-short-circuiting does not occur, and it becomes possible to stabilize the welding state. The present invention provides significant advantages particularly in middle-to-high current range welding.

Further, in a preferred embodiment, the welding current is not decreased rapidly if the second-order differential value of the welding voltage (the change rate of the welding voltage differential value) at the time when a squeezed droplet is detected is not smaller than the reference value, based on the determination that the arc will restrike soon and the squeeze period is short. On the contrary, if the second-order differential value of the welding voltage is smaller than the reference value, the welding current is decreased rapidly based on the determination that the squeeze period is a normal squeeze period. This feature improves welding stability when the squeeze period is short, and provides further improved stability in welding, in addition to the advantages provided by the first invention. The invention provides significant advantages particularly in middle-to-high current range welding in which the short circuiting is accompanied by whichever of a short squeeze period and a normal squeeze period.

Other features and advantages of the present invention will become apparent from the detailed description given below with reference to the accompanying drawings.

DETAILED DESCRIPTION OF THE PREFERRED EMBODIMENTS

Preferred embodiments of the present invention will be described below with reference to the drawings.

Embodiment 1

Figure 1:
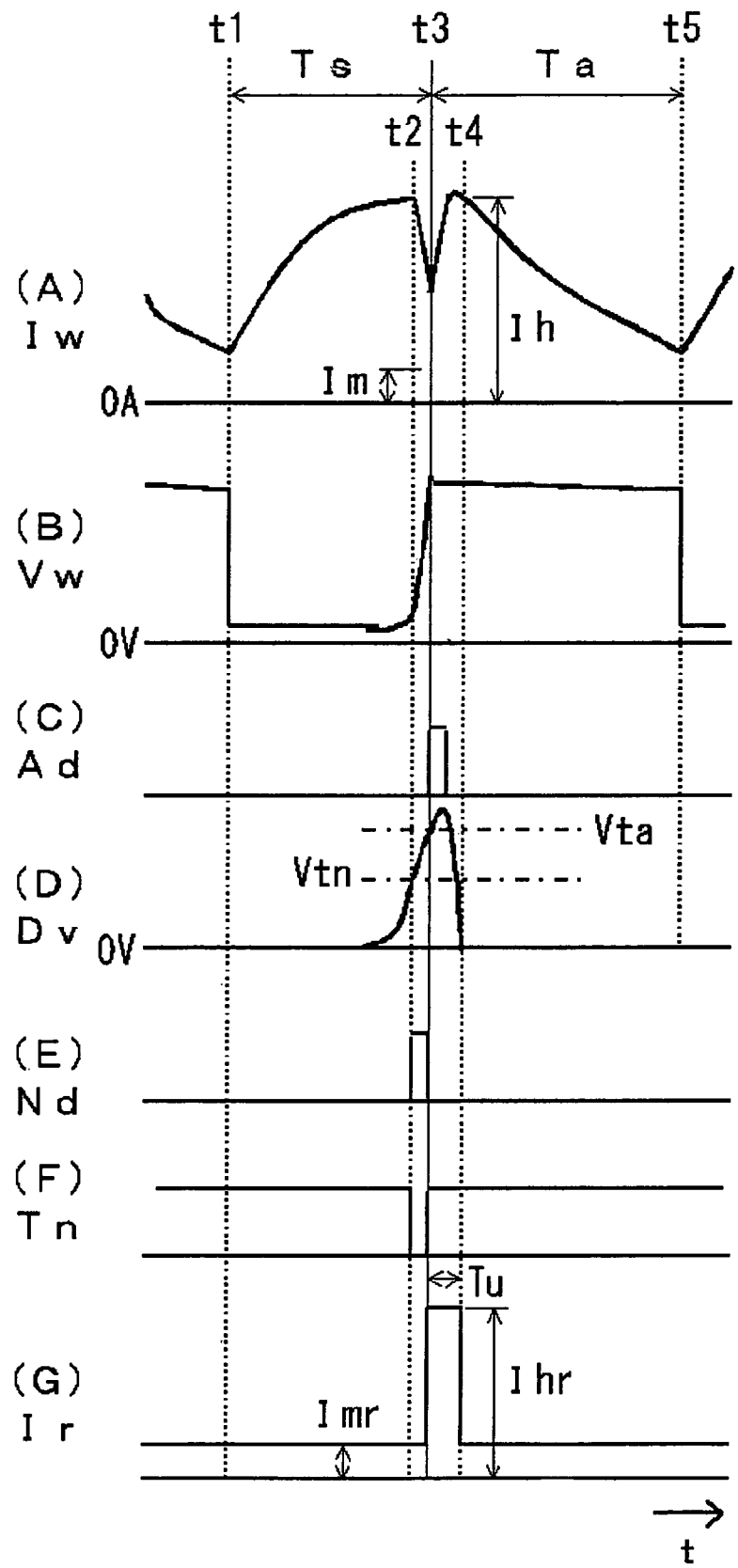
FIG. 1 is a timing chart depicting a squeezing detection control method in consumable electrode arc welding according to Embodiment 1 of the present invention.
Figure 8:
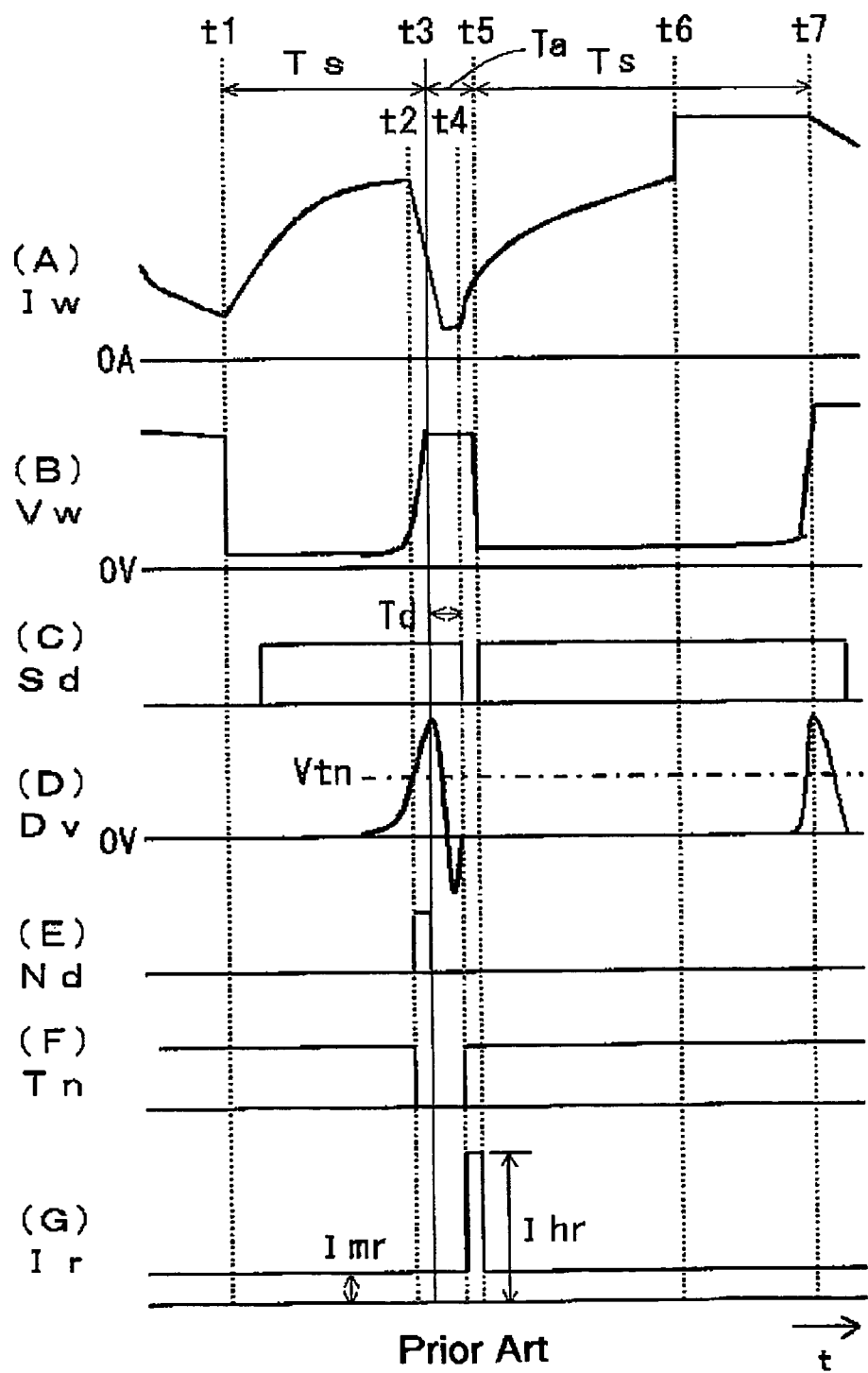
FIG. 8 is a timing chart corresponding to FIG. 7, for describing problems.

FIG. 1 is a timing chart depicting a squeezing detection control method in consumable electrode arc welding according to a first embodiment or Embodiment 1 of the present invention. Graph 1(A) shows the waveform of a welding current Iw, Graph 1(B) the waveform of a welding voltage Vw, Graph 1(C) the waveform of an arc recurrence determination signal Ad, Graph 1(D) the waveform of a voltage differentiation signal Dv, Graph 1(E) the waveform of a squeeze detection signal Nd, Graph 1(F) the waveform of a squeeze detection period signal Tn, and Graph 1(G) the waveform of an electric-current setting signal Ir. FIG. 1 corresponds to FIG. 8 described above. It should be noted that the short circuit determination signal Sd in Graph 8(C) is replaced by the arc recurrence determination signal Ad in Graph 1(C). Like FIG. 8, FIG. 1 shows a case in which the arc restrikes immediately after a squeezed droplet is detected. Hereinafter, reference will be made to FIG. 1.

When a squeezed droplet appears at Time Point t2, the voltage differentiation signal Dv rises rapidly as shown in Graph 1(D) and reaches the squeeze detection reference value Vtn. In response to this, as shown in Graph 1(E), the squeeze detection signal Nd assumes High level for a short period of time. As shown in Graph 1(F), the squeeze detection period signal Tn drops to a Low level. Since the transistor TR in FIG. 2 is turned off, the welding current Iw decreases as shown in Graph 1(A).

When the arc restrikes at Time Point t3, the welding voltage Vw increases rapidly as shown in Graph 1(B). The rate of increase is at least 1.5 times the rate at Time Point t2 which is the time when the squeezed droplet appears. Because of this, as shown in Graph 1(D), the voltage differentiation signal Dv reaches a predetermined arc recurrence reference value Vta at Time Point t3. The arc recurrence reference value Vta is greater than the squeeze detection reference value Vtn. At Time Point t3, Dv is no smaller than Vta (i.e. Dv≥Vta), the arc recurrence determination signal Ad assumes High level for a short period of time as shown in Graph 1(C). In response, as shown in Graph 1(E), the squeeze detection period signal Tn assumes High level, turning on the transistor TR. Simultaneously, as shown in Graph 1(G), the electric-current setting signal Ir assumes high arc-current setting value Ihr. As a result, the welding current Iw begins to increase at Time Point t3 without delay.

If the arc restrikes at Time Point t3 immediately after the squeeze detection at Time Point t2, the welding current Iw quickly assumes the high arc current Ih as described above. Thus, no short-circuiting occurs, and the state of welding remains stable.

Figure 2:
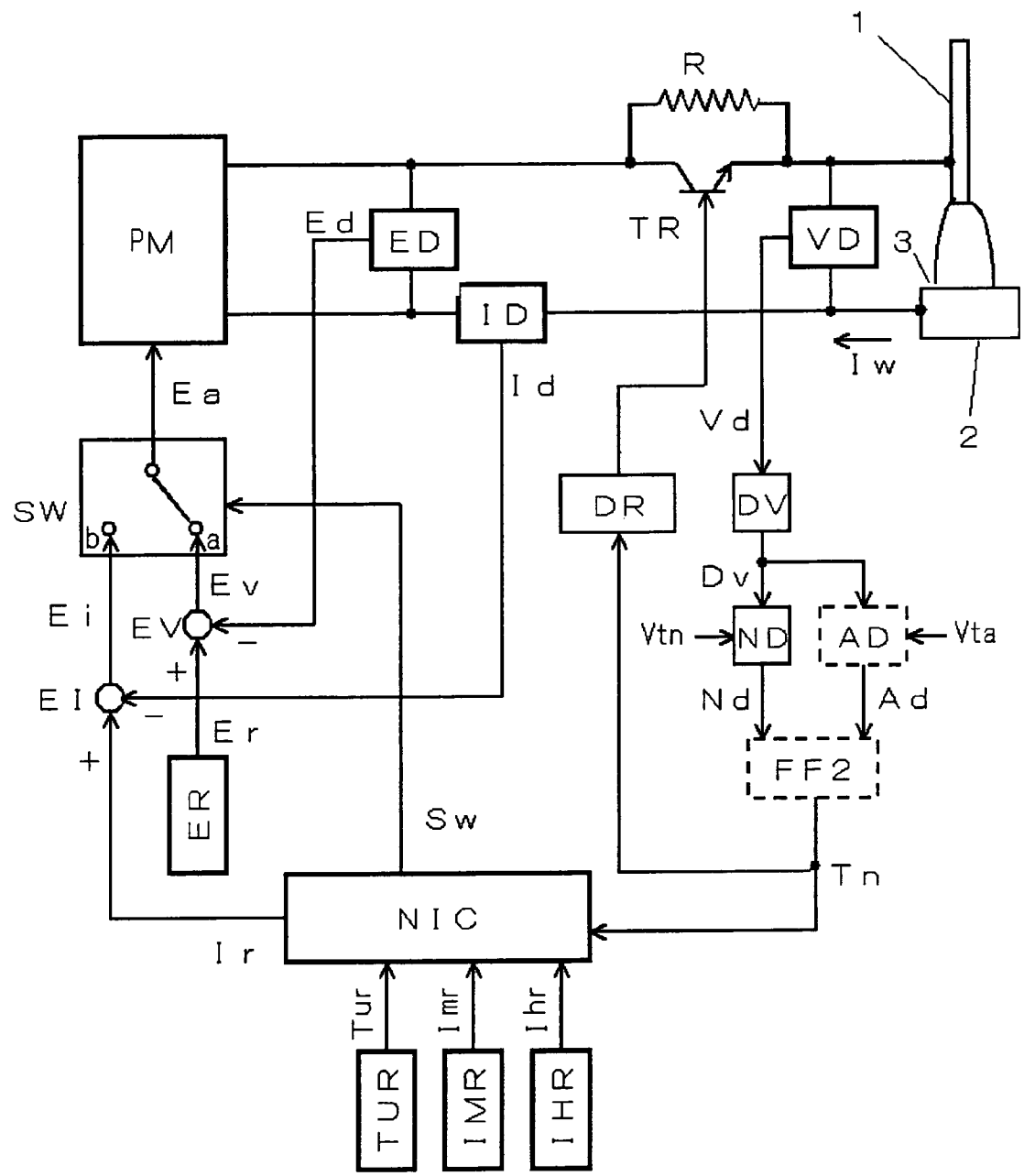
FIG. 2 is a block diagram of a welding power source for embodying the squeezing detection control method in consumable electrode arc welding according to Embodiment 1.
Figure 6:
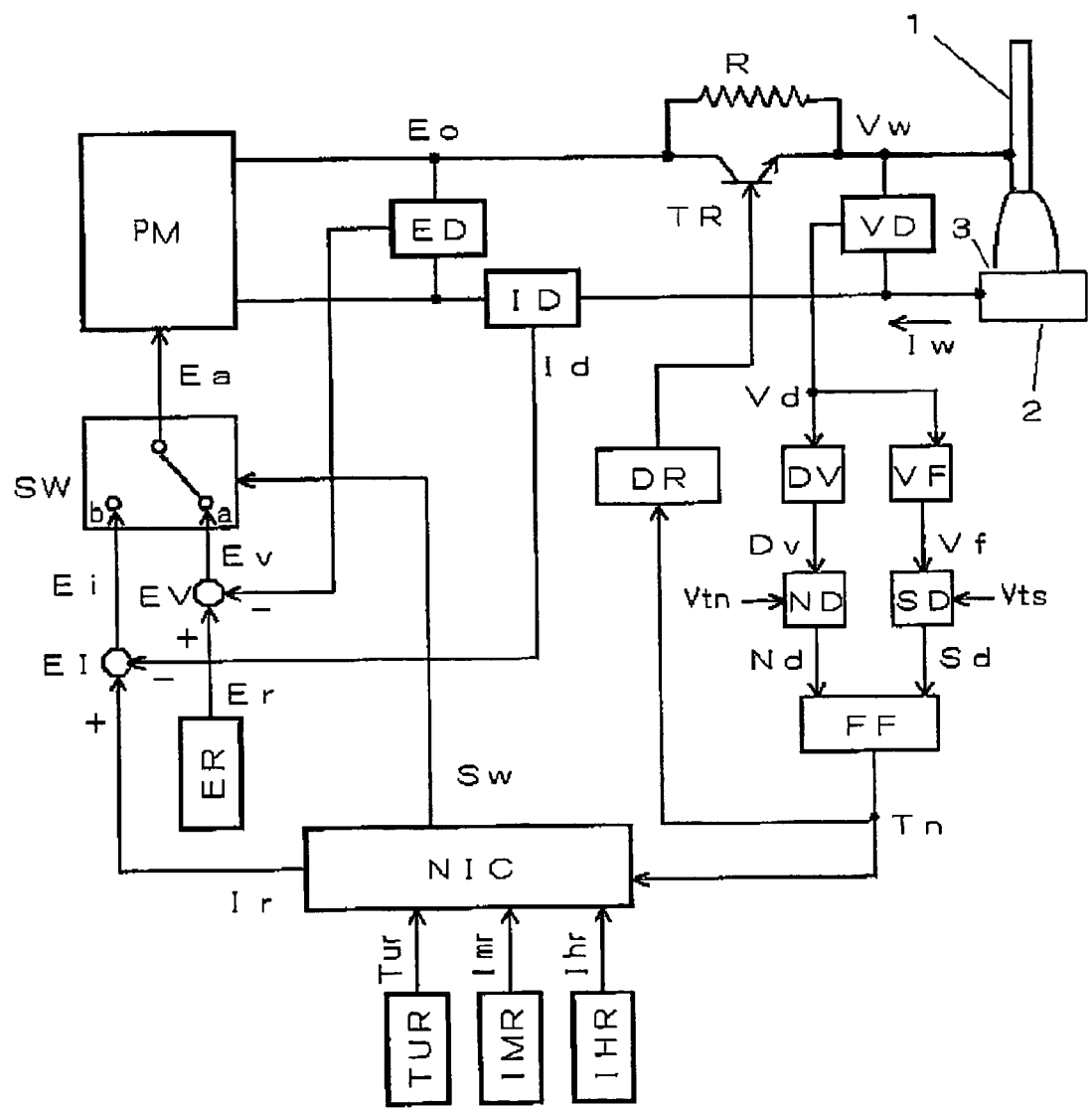
FIG. 6 is a block diagram of a welding power source which operates on a conventional squeezing detection control method.
Figure 7:
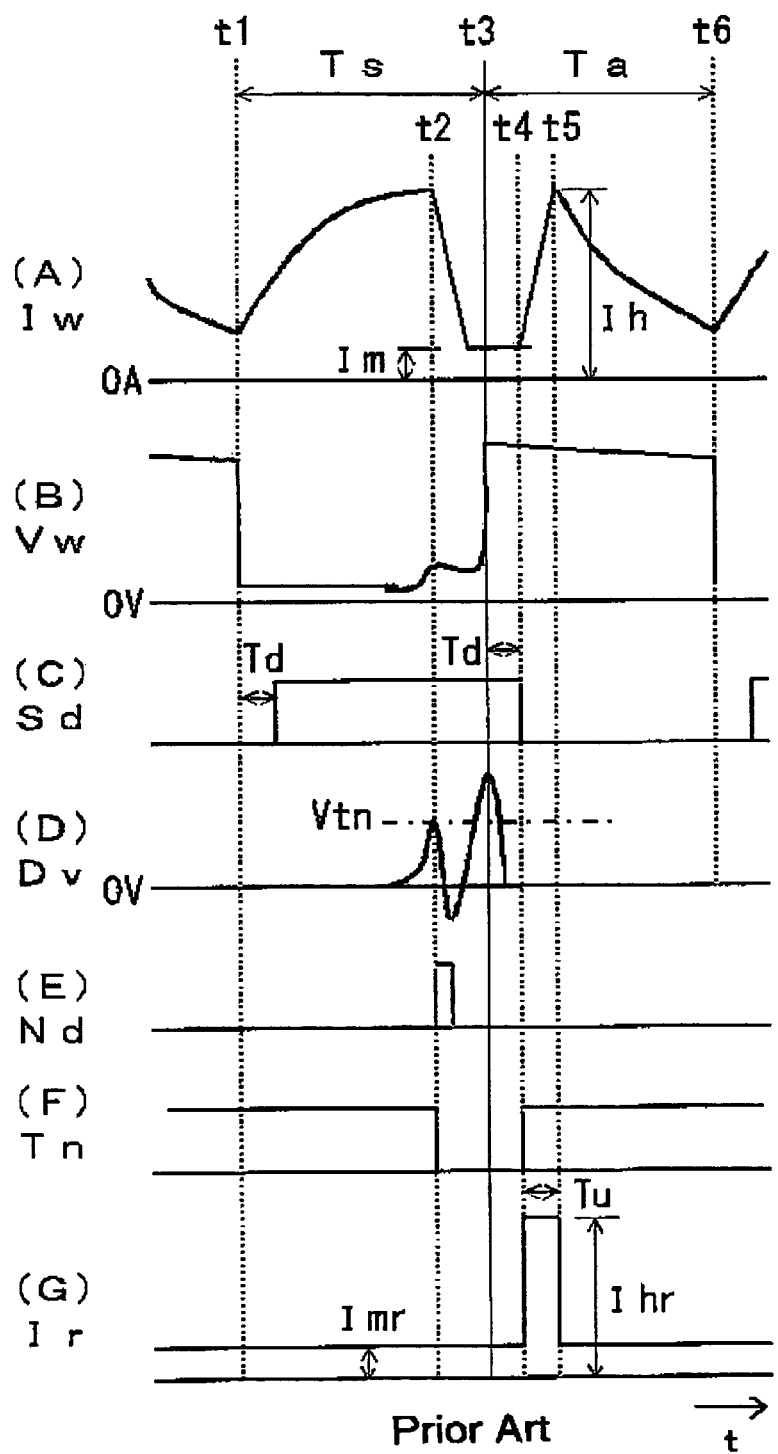
FIG. 7 is a timing chart of signals in the welding power source in FIG. 6.

FIG. 2 is a block diagram of a welding power source for implementing the above-described squeezing detection control method in consumable electrode arc welding. In FIG. 2, blocks which are identical or similar to those in FIG. 6 described earlier are indicated by the same reference codes and their description will not be repeated. Hereinafter, description will be made for blocks drawn in broken lines which are different from those in FIG. 6.

An arc recurrence determination circuit AD outputs an arc recurrence determination signal Ad which assumes High level for a short period of time at a time point when the voltage differentiation signal Dv in the short circuit period has reached a predetermined arc recurrence reference value Vta. A second flip-flop circuit FF2 outputs a squeeze detection period signal Tn which is brought to Low level by the squeeze detection signal Nd, and to High level by the arc recurrence determination signal Ad.

Embodiment 2

Figure 3:
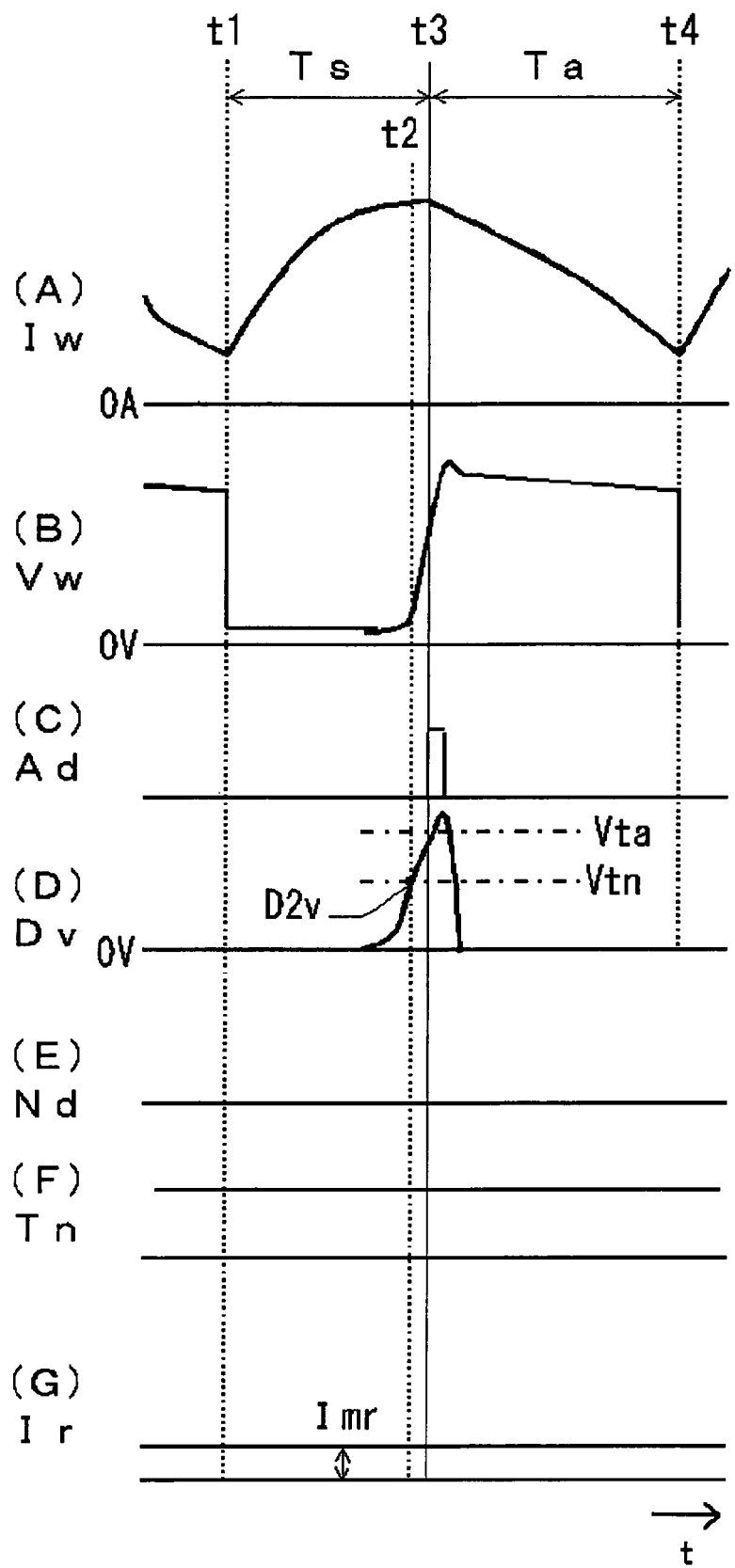
FIG. 3 is a timing chart depicting a squeezing detection control method in consumable electrode arc welding according to Embodiment 2 of the present invention.

FIG. 3 shows a timing chart depicting a squeezing detection control method in consumable electrode arc welding according to a second embodiment or Embodiment 2 of the present invention. Graphs 3(A)-3(G) show different patterns of the signals in FIG. 1 described above. FIG. 3 shows a case in which the squeeze period (i.e. the period from squeeze detection to arc recurrence) is relatively short. In general, the squeeze period can be divided into two categories: normal length squeeze period and relatively short length squeeze period. The normal length of the squeeze period may be a few hundreds of microseconds, whereas the relatively short length may be no greater than 100 μs, which is the case with Embodiment 2. If middle-to-high current range welding has a relatively short squeeze period, it may be better to maintain the welding current Iw at the present level rather than to decrease it rapidly for the purpose of ensuring stable welding.

Specifically, when a squeezed droplet appears at Time Point t2 in FIG. 3, the welding voltage Vw increases as shown in Graph 3(B), and as shown in Graph 3(D), the voltage differentiation signal Dv increases rapidly to the squeeze detection reference value Vtn. At this point, a change rate D2v of the voltage differentiation signal Dv is calculated, and the obtained value is compared with a predetermined change rate reference value Vtm. If D2v≥Vtm, the squeeze detection signal Nd in Graph 3(E) is not outputted (the low level is maintained). If D2v<Vtm, the squeeze detection signal Nd is outputted (change to High level). FIG. 3 shows a case where D2v≥Vtm, so no squeeze detection signal Nd is produced. Thus, the neck detection period signal Tn in Graph 3(F) remains at High level, and the transistor TR remains in the ON state. Accordingly, as shown in Graph 3(A), the welding current Iw does not decrease rapidly, but remains at substantially the same value. Then, as the arc restrikes at Time Point t3 immediately after Time Point t2, as shown in Graph 3(D), the value of voltage differentiation signal Dv becomes no longer smaller than the arc recurrence reference value Vta, and as shown in Graph 3(C), the arc recurrence determination signal Ad assumes High level for a short period of time. On the other hand, the squeeze detection period signal Tn remains at High level, as shown in Graph 3(E). Thus, as shown in Graph 3(A), the welding current Iw decreases gradually in response to the arc load from the time when the arc restrikes at Time Point t3.

In the above description, the change rate D2v of the voltage differentiation signal Dv is D2v=dDv/dt. Therefore, the change rate D2v of the voltage differentiation signal Dv is a second-order differential value of the welding voltage Vw, i.e. $D2v=d^2Vw/dt^2$. A greater value of D2v indicates that the squeezing is rapidly progressing, and that a new arc will occur soon. Thus, it is possible to estimate, based on the value of D2v, whether the squeeze period is short or not.

Figure 4:
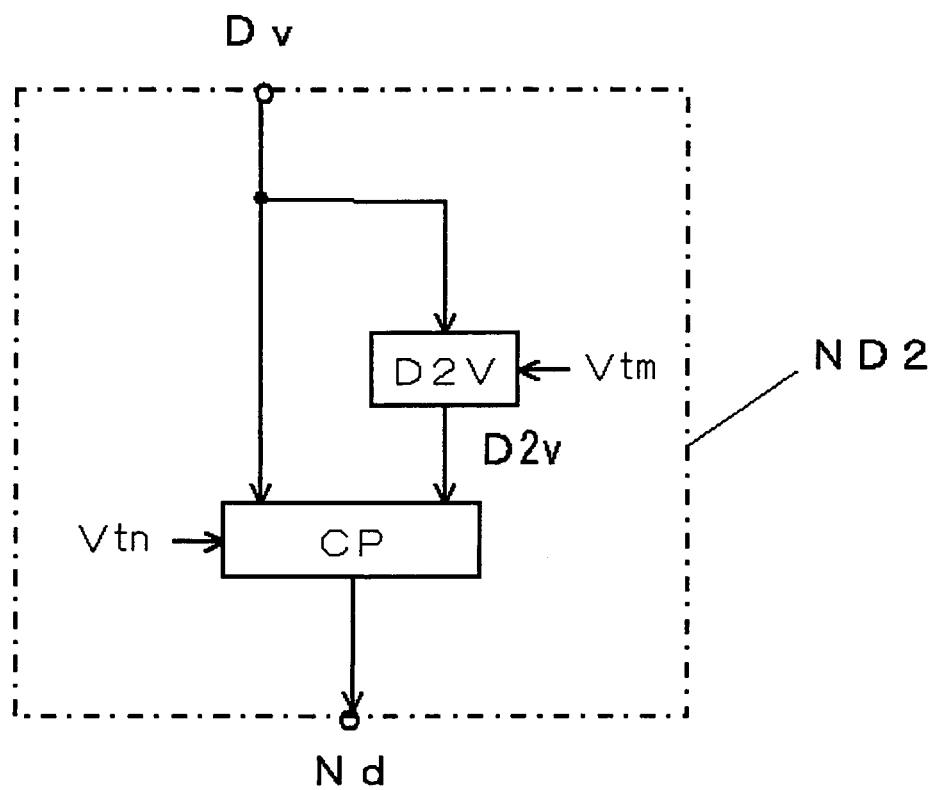
FIG. 4 is a detailed block diagram of a second squeeze detection circuit ND2 in a welding power source for embodying the squeezing detection control method in consumable electrode arc welding according to Embodiment 2.
Figure 5:
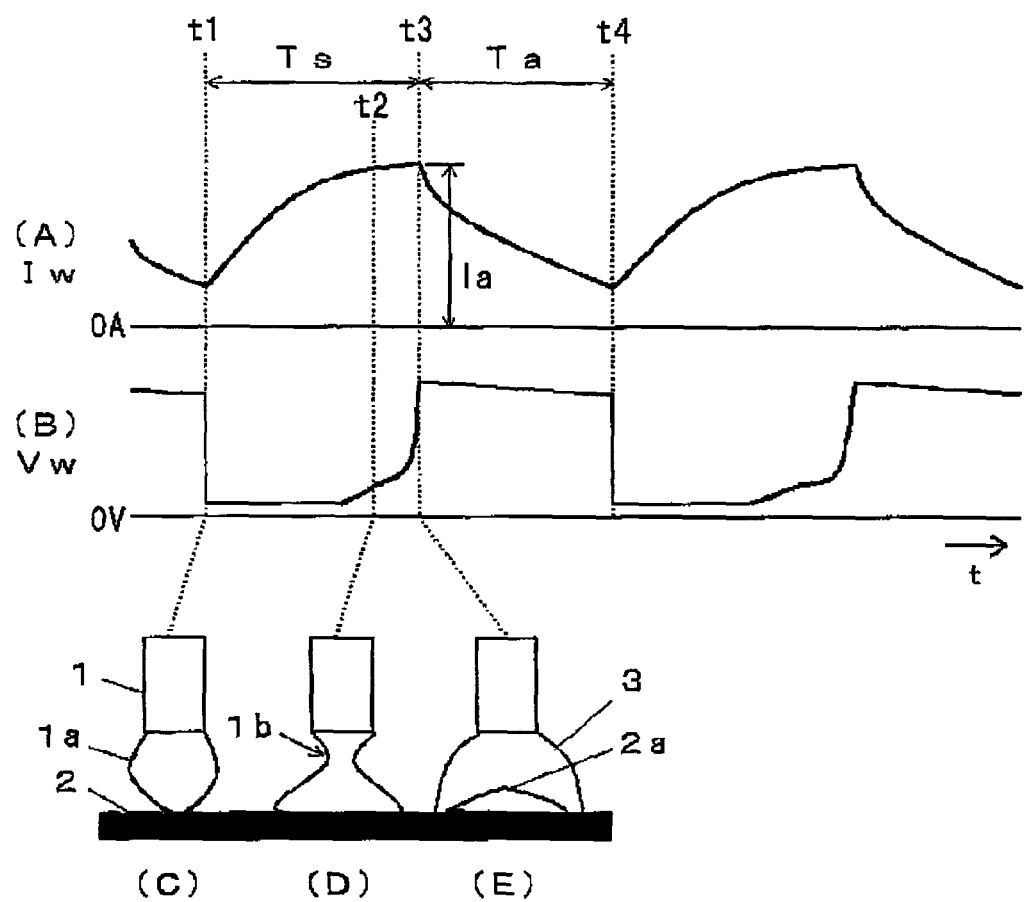
FIG. 5 shows an electric-current and voltage waveform and a droplet in consumable electrode arc welding in which a cycle of a short circuit period Ts and an arc period Ta is repeated.

FIG. 4 is a block diagram of a second squeeze detection circuit ND2 in a welding power source for implementing the squeezing detection control method in consumable electrode arc welding according to Embodiment 2. The welding power source as a whole has the same block configuration as in FIG. 2, differing only in that the squeeze detection circuit ND in FIG. 2 is replaced by the second squeeze detection circuit ND2 in FIG. 4.

A change rate calculation circuit D2V calculates a change rate (differential value) of the voltage differentiation signal Dv, and outputs a change rate signal D2v. A comparison circuit CP outputs a squeeze detection signal Nd (which assumes High level for a short period of time), if the value of the voltage differentiation signal Dv becomes equal to the squeeze detection reference value Vtn and if the value of the change rate signal D2v upon that moment is smaller than the change rate reference value Vtm. Therefore, if the value of the change rate signal D2v is no smaller than the change rate reference value Vtm, no squeeze detection signal Nd is produced (Low level is maintained).

According to Embodiment 2, if the D2v, at the time when a squeezed droplet is detected, is no smaller than the reference value Vtm, the welding current Iw is not decreased rapidly, since the arc is expected to restrike soon. On the other hand, if the D2v is smaller than the reference value Vtm, the welding current Iw is decreased rapidly since the squeeze period is considered as having a normal squeeze period. This arrangement further improves welding stability for middle-to-high current range welding, in addition to advantages provided by Embodiment 1.

The above description for Embodiments 1 and 2 assumes that the squeeze detection is made on the basis of the change in the welding voltage Vw. However, as described earlier, the detection may be made on the basis of the change in the resistance r between the power supply chip and the base metal. The present invention provides major advantages in middle-to-high current range welding. However, the invention provides an advantage of improved stability in the welding also in low current range welding.

The invention claimed is:

1. A squeezing detection control method in consumable electrode arc welding in which a cycle of arc generation and short-circuiting is repeated between a consumable electrode and a base metal, the method comprising:
    detecting a squeezed droplet as a premonitory sign of arc recurrence at an end of the short-circuiting, the detecting being based on a fact that a differential value of a welding voltage or resistance between the consumable electrode and the base metal increases to a first detection reference value, the differential value being defined as a change rate of the welding voltage or resistance; and
    detecting recurrence of the arc;
    wherein the arc recurrence is detected by a fact that the differential value of the welding voltage or resistance increases to a second detection reference value that is greater than the first detection reference value, subsequent to detection of the squeezed droplet.

2. The squeezing detection control method according to claim 1, further comprising:
    decreasing rapidly a welding current supplied to a short-circuit load immediately upon the detection of the squeezed droplet before detecting the arc recurrence; and
    increasing the welding current immediately upon the detection of the arc recurrence.

3. The squeezing detection control method according to claim 1, wherein when a second-order differential value of the welding voltage or resistance upon the detection of the squeezed droplet is greater than a predetermined value, a squeeze detection period signal is kept at a high level even upon the detection of the squeezed droplet, the second-order differential value of the welding voltage or resistance being defined as a change rate of the differential value of the welding voltage or resistance.

4. The squeezing detection control method according to claim 2,
    wherein a squeeze detection period signal drops to a low level upon the detection of the squeezed droplet; and
    wherein the squeeze detection period signal rises to a high level upon the detection of the arc recurrence.

5. A squeezing detection control method in consumable electrode arc welding in which a cycle of arc generation and short-circuiting is repeated between a consumable electrode and a base metal, the method comprising:
    detecting a squeezed droplet as a premonitory sign of arc recurrence at an end of the short-circuiting, the detecting being based on a fact that a differential value of a welding voltage or resistance between the consumable electrode and the base metal increases to a first detection reference value, the differential value being defined as a change rate of the welding voltage or resistance; and
detecting recurrence of the arc;
wherein the arc recurrence is detected by a fact that the differential value of the welding voltage or resistance increases to a second detection reference value that is greater than the first detection reference value, subsequently to detection of the squeezed droplet; and
wherein when a second-order differential value of the welding voltage or resistance upon the detection of the squeezed droplet is greater than a predetermined value, no squeeze detection signal is generated and a squeeze detection period signal is kept at a high level even upon the detection of the squeezed droplet.

* * * * *